United States Patent [19]
Lee

[11] Patent Number: 6,141,780
[45] Date of Patent: Oct. 31, 2000

[54] FABRICATION PROCESS ACCEPTANCE TESTER AND FABRICATION PROCESS USING A MAINTENANCE REGION OF A DISK

[75] Inventor: Je-Ryong Lee, Gumi, Rep. of Korea

[73] Assignee: SamSung Electronics Co., Ltd., Suwon, Rep. of Korea

[21] Appl. No.: 08/951,153

[22] Filed: Oct. 15, 1997

[30] Foreign Application Priority Data

Oct. 30, 1996 [KR] Rep. of Korea ....................... 96-50278

[51] Int. Cl.[7] ................................................. G11C 29/00
[52] U.S. Cl. ................................. 714/718; 714/719
[58] Field of Search ................................ 360/75; 714/44, 714/718, 719, 723, 819, 824

[56] References Cited

U.S. PATENT DOCUMENTS

| | | |
|---|---|---|
| 3,710,235 | 1/1973 | Barrager et al. . |
| 4,152,695 | 5/1979 | Democrate et al. . |
| 4,504,871 | 3/1985 | Berwick et al. ........................... 360/31 |
| 5,047,874 | 9/1991 | Yomtoubian . |
| 5,166,936 | 11/1992 | Ewert et al. . |
| 5,210,860 | 5/1993 | Pfeffer et al. . |
| 5,424,638 | 6/1995 | Huber . |
| 5,654,841 | 8/1997 | Hobson et al. . |
| 5,661,615 | 8/1997 | Waugh et al. ............................. 360/75 |

*Primary Examiner*—Hoa T. Nguyen
*Attorney, Agent, or Firm*—Robert E. Bushnell, Esq.

[57] ABSTRACT

A method of fabricating a hard disk drive is disclosed and includes the steps of recording a test result obtained from a final test process on a predetermined region of a disk, and judging whether the hard disk drive is accepted or not, by reading the recorded test result, thereby preventing a defective hard disk drive from being produced. A fabrication process acceptance tester for carrying out the method is also disclosed.

19 Claims, 9 Drawing Sheets

(Prior Art) Fig. 1

FABRICATION PROCESS ACCEPTANCE TESTER AND FABRICATION PROCESS USING A MAINTENANCE REGION OF A DISK

CLAIM OF PRIORITY

This application makes reference to, incorporates the same herein, and claims all benefits accruing under 35 U.S.C. §119 from an application for FABRICATION PROCESS ACCEPTANCE TESTER AND FABRICATION PROCESS USING THE SAME earlier filed in the Korean Industrial Property Office on the day of Oct. 30$^{th}$ 1996 and there duly assigned U.S. Ser. No. 50278/1996.

BACKGROUND OF THE INVENTION

1. Technical Field

The present invention relates to hard disks and to processes for fabrication of hard disk drive and, more particularly, to an acceptance tester for testing the acceptance of a hard disk drive that has passed through a series of fabrication processes, and a method of fabricating the hard disk drive using the acceptance tester.

2. Related Art

Hard disk drives, which are widely used as auxiliary memory devices in a computer system, pass through a series of fabrication processes. Exemplars that are representative of recent efforts in the art include particular construction of hard disk drives and fabrication and testing, such as U.S. Pat. No. 5,654,841 to Hobson et al., entitled Detection Of Mechanical Defects In A Disc Drive Using Injected Test Signals, U.S. Pat. No. 5,424,638 to Huber, entitled Sampled Data Flaw Detection For Magnetic Media, U.S. Pat. No. 5,210,860 to Pfeffer et al., entitled Intelligent Disk Array Controller, U.S. Pat. No. 5,166,936 to Ewert et al., entitled Automatic Hard Disk Bad Sector Remapping, U.S. Pat. No. 5,047,874 to Yomtoubian, entitled Technique For Certifying Disk Recording Surface, U.S. Pat. No. 4,152,695 to Democrate et al., entitled Method Of Writing Infornation Relating To Faults In A Magnetic Recording Medium, and U.S. Pat. No. 3,710,235 to Barrager et al., entitled Method And Apparatus For Testing Batch Fabricated Magnetic Heads During Manufacture Utilizing A Magnetic Field Generated By A Current Carrying Conductor.

Some of these efforts (see, for example, Hobson et al. '841 and Barrager et al. '235) disclose methods and apparatus for testing for mechanical defects in a disk drive during the manufacturing process. These methods and apparatus, however, involve the application of electrical current or signals to the magnetic media in combination with complicated and expensive hardware arrangements for analyzing the results and detecting flaws in the manufacture of the product. Other patents listed above (for example, see Ewert et al. '936) disclose methods and arrangements for detecting flaws in magnetic media well after the manufacturing process is completed (for example, during use of the product by a user).

In other conventional fabrication processes for a hard disk drive, the acceptance of each hard disk drive set is finally tested using only pass or fail data in accordance with a final test program. Accordingly, if an Hard disk drive set having defects is judged as having passed the test due to an error in the final test system or due to an operator's error, the Hard disk drive set having defects is not able to be detected in any following process step, resulting in production of a poor hard disk drive set.

SUMMARY OF THE INVENTION

It is therefore, one object to provide an improved apparatus and process for fabricating and testing hard disk drives.

It is another object to provide an acceptance tester able to minimize the possibility that a hard disk drive having defects will be produced in a fabrication process of a hard disk drive.

It is still another object to provide a method for fabricating a hard disk drive, that prevents an hard disk drive having defects from being produced using a fabrication process acceptance tester.

These and other objects may be achieved with an apparatus and process for fabricating a hard disk drive by performing various preliminary testing steps, including a final test process, on the hard disk drive, obtaining a test result from the final test process, recording the test result on a predetermined region of the hard disk drive, and then reading the recorded test result from the predetermined region of the hard disk drive so as to determine whether or not the hard disk drive is accepted. The test result may be recorded upon a maintenance region of the disk, and a product test process may be performed between the final test process and the product test process, and various preliminary testing steps may be performed while setting up the hard disk drive.

BRIEF DESCRIPTION OF THE DRAWINGS

A more complete appreciation of the invention, and many of the attendant advantages thereof, will be readily apparent as the same becomes betterunderstood by reference to the following detailed description when considered in conjunction with the accompanying drawings in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings.

Figure 1:
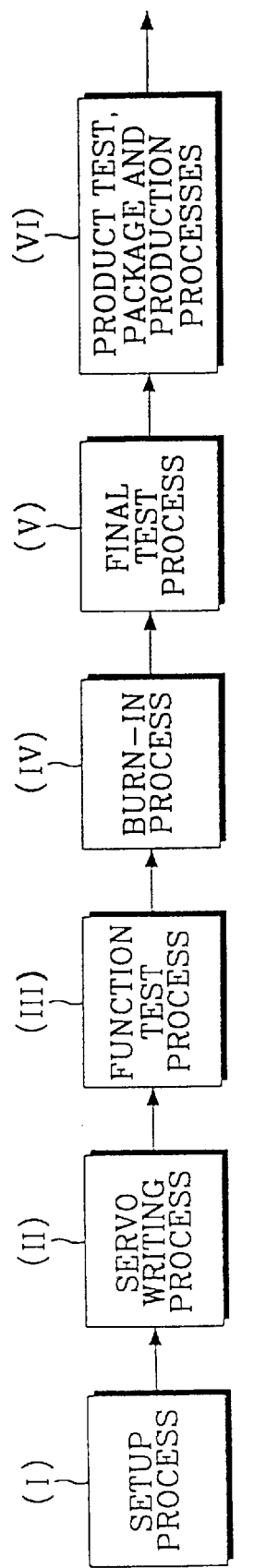
FIG. 1 shows a conventional fabrication process for a conventional hard disk drive.

FIG. 1 shows a conventional fabrication process for a conventional hard disk drive. Referring to FIG. 1, the first step (I) is a setup process, wherein a head disk assembly (HDA), which is a mechanical part of the hard disk drive (hard disk drive), is setup in a clean room. The second step (II) is a servo writing process, wherein a servo record pattern for servo-controlling an actuator is recorded on the disk using a servo writer.

The third step (III) is a function test process, wherein the HDA formed at the first step (I) and a PCBA formed at a PCBA setting process, (which is conventionally performed after the setup process) are combined, and the initial test is carried out if the HDA and PCBA are normally matched and operated. Here, a fundamental test for twenty to twenty-five minutes is carried out in combination with a specific test system.

Figure 2:
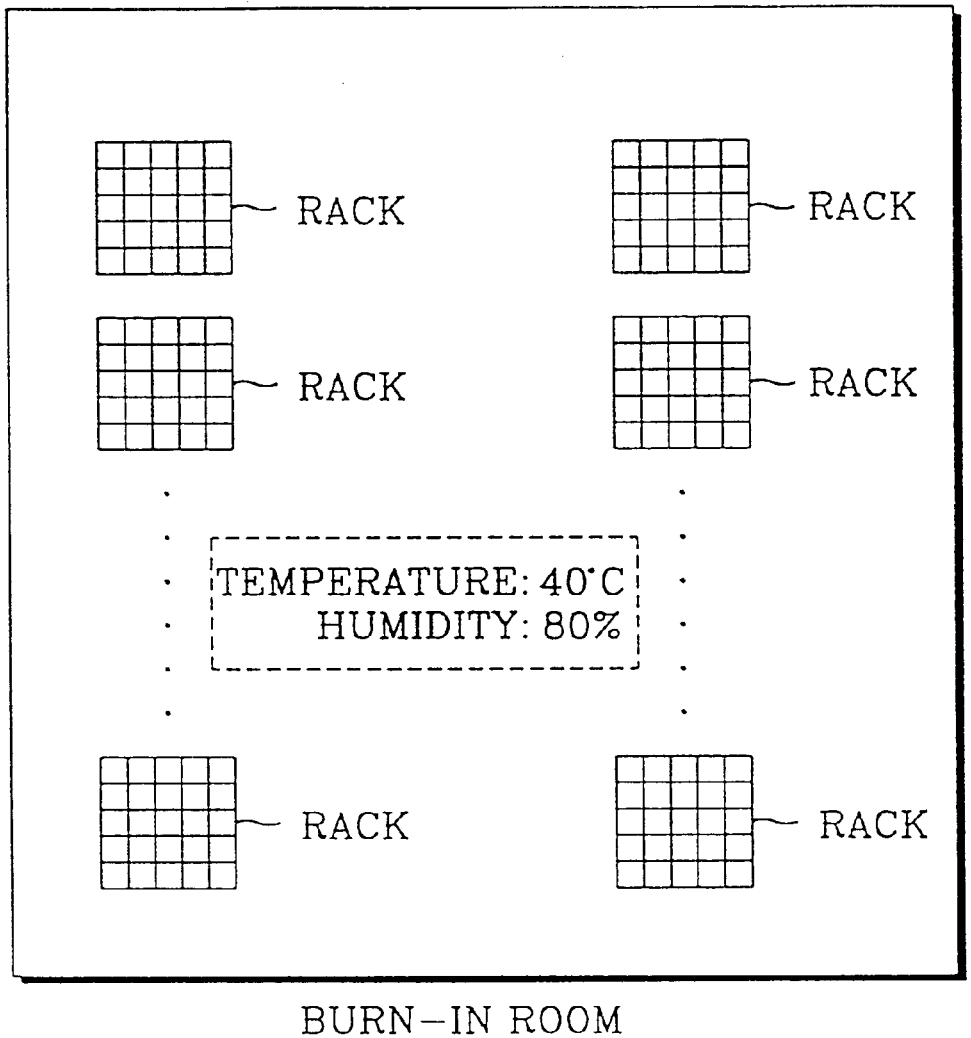
FIG. 2 shows a burn-in room where a burn-in process of the fabrication process of FIG. 1 is performed.

The fourth step (IV) is a bum-in process requiring a longer time of eight to sixteen hours. It is performed according to its own program (firmware) on arack in a bum-in room, as shown in FIG. 2. At this bum-in process, in order to have users normally use the hard disk drive, a portion of the disk where defects are generated is found in advance so as to thereby avoid the defective portion when the drive is used. The fifth step (V) is a final test process, wherein a test is performed if the defects placed on the hard disk drive set which passed the burn-in process are normally treated or not. That is, the hard disk drive set is tested if the defects placed thereon are treated using a specific test system as shown in FIG. 3.

Figure 3:
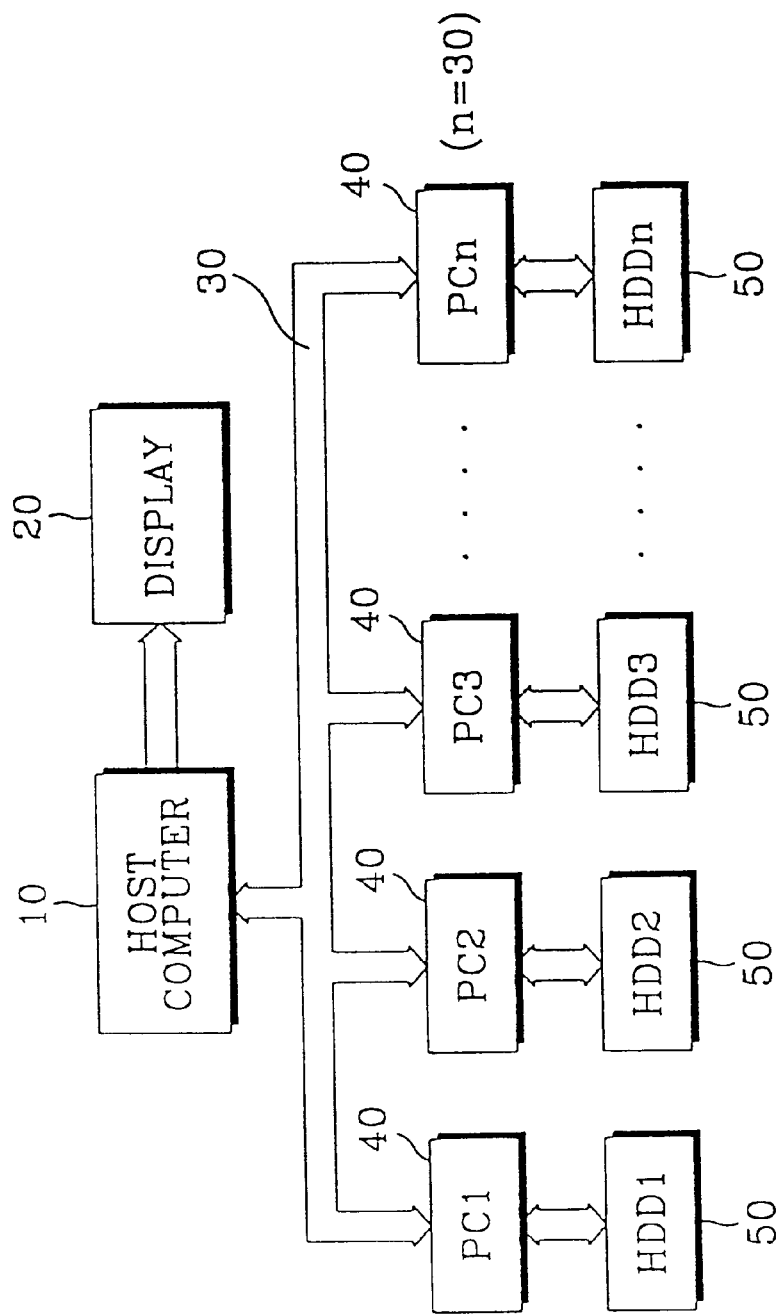
FIG. 3 is a block diagram of a system for performing a final test process of the fabrication process of FIG. 1.

FIG. 3 is a block diagram of a system for finally testing the hard disk drive set which passed the burn-in process. In FIG. 3, a hard disk drive set (HDD1 to HDDn) 50 is connected to a personal computer (PC1 to PCn, n=30) 40 on a one-to-one basis so as to be fitted to the user's environment. Each PC 40 connected to a host computer 10 through a local area network (LAN) 30 tests the hard disk drive set 50 according to a test program, and outputs its result to host computer 10 through LAN 30. Accordingly, host computer 10 displays on display 20 pass/fail data of each hard disk drive set input from each PC 40. Thus, an operator placed on a line can judge whether the hard disk drive set is accepted or not, using the monitored pass/fail data. Meanwhile, the hard disk drive set which passed the final test process of the fifth step (V) moves on to the sixth step (VI) of production test, package and production processes.

Figure 4:
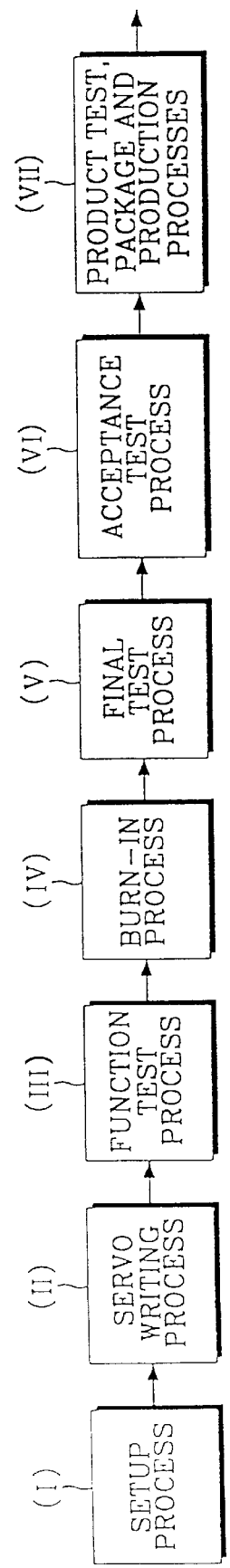
FIG. 4 shows a fabrication process for a hard disk drive according to an embodiment of the present invention.

FIG. 4 shows a fabrication process for a hard disk drive according to an embodiment of the present invention. Referring to FIG. 4, the fabrication process of the present invention is developed such that an acceptance testing process (VI) is added to the conventional fabrication process of the hard disk drive shown in FIG. 1. That is, the setup process (I), the servo writing process (II), the function test process (III), the burn-in process (IV), the final test process (V), and the product test, package and production processes (VII) are the same as in the conventional process of FIG. 1. However, in the final test process (V), a test result developed by a test program is recorded on a system zone SZ (that is, a maintenance region) of hard disk 22 as pass/fail data (see FIG. 6) in a general recording mode. By doing so, a determination can be made as to whether or not the hard disk drive set 50 has defects.

Acceptance test process (VI) is inserted between the final test process (V) and the product test, package and production process (VII). In acceptance test process (VI), a determination is made as to whether or not the hard disk drive set 50, which passed the final test process (V), has defects. A fabrication process acceptance tester 60 (FIG. 7) of the hard disk drive for performing acceptance test process (VI) will be explained below.

Figure 5:
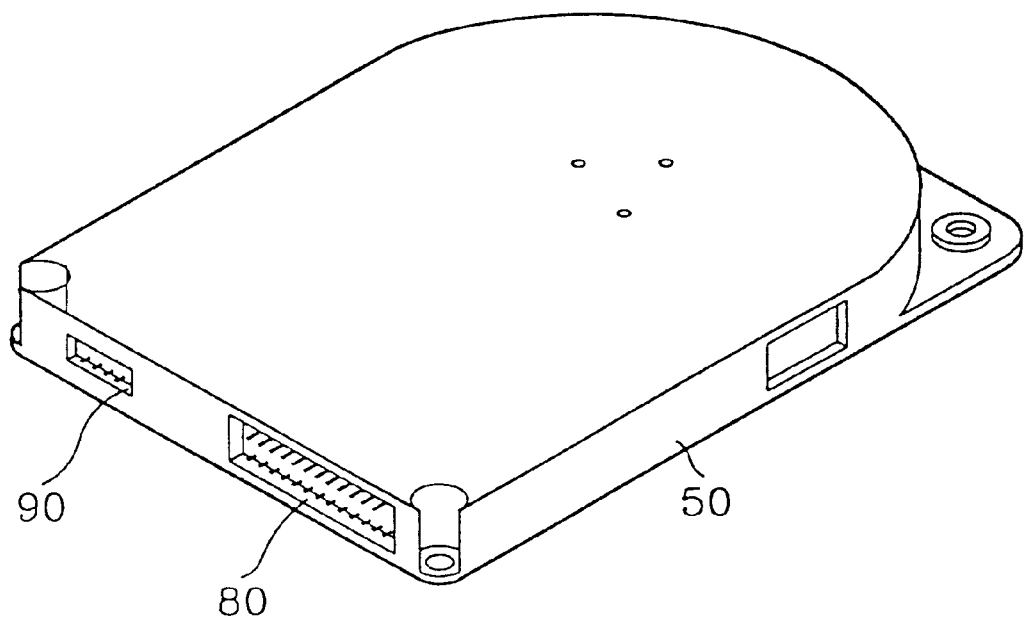
FIG. 5 is a perspective view of a general hard disk drive set.
Figure 7:
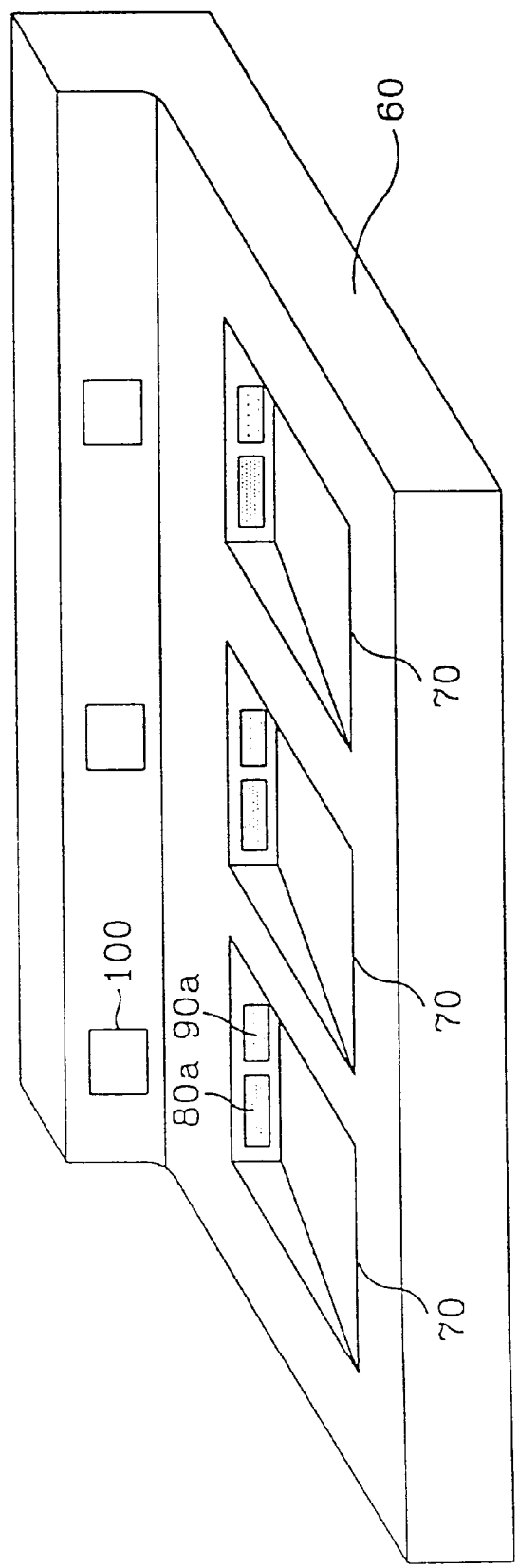
FIG. 7 is a perspective view of an acceptance tester according to the embodiment of the present invention.

FIG. 5 is a perspective view of a general hard disk drive set 50. Referring to FIG. 5, hard disk drive set 50 has a four-pin power port (5V, 12V,GND) 90 and a forty-pin signal port 80, while FIG. 7 is a perspective view of acceptance tester 60 according to an embodiment of the present invention Referring to FIGS. 5 and 7, hard disk drive set 50 is mounted on mount 70 of acceptance tester 60. Thus, mount 70 is the place for mounting hard disk drive set 50, the latter having passed a series of fabrication process steps on acceptance tester 60. Acceptance tester 60 has connectors 80a and 90a to which signal port 80 and power port 90, respectively, of hard disk drive set 50 are connected. Connectors 80a and 90a are connected to a motherboard including a controller (not shown). A display 100 displays pass/fail states of hard disk drive set 50 mounted on mount 70. A process of displaying the pass/fail states of hard disk drive set 50 will be explained below with reference to FIGS. 8 and 9.

Figure 8:
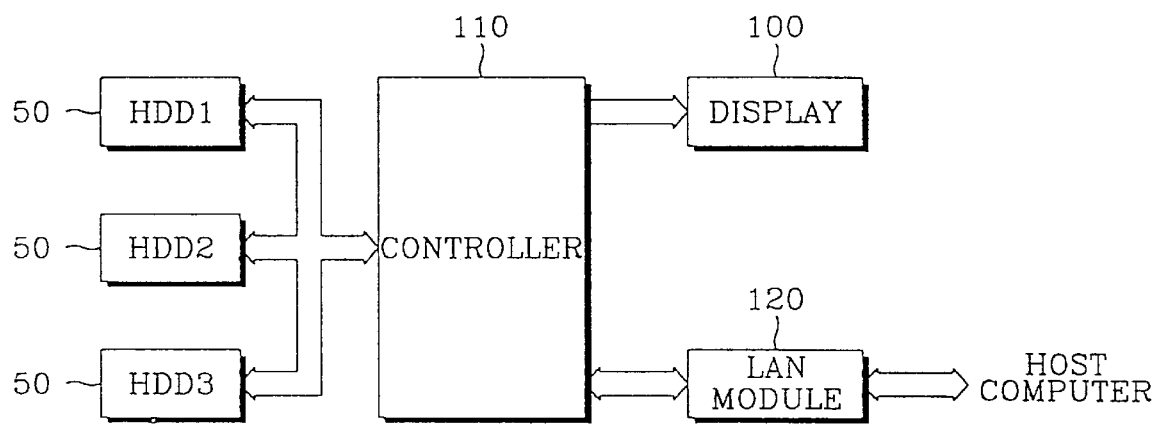
FIG. 8 is a block diagram of the acceptance tester according to the embodiment of the present invention.
Figure 9:
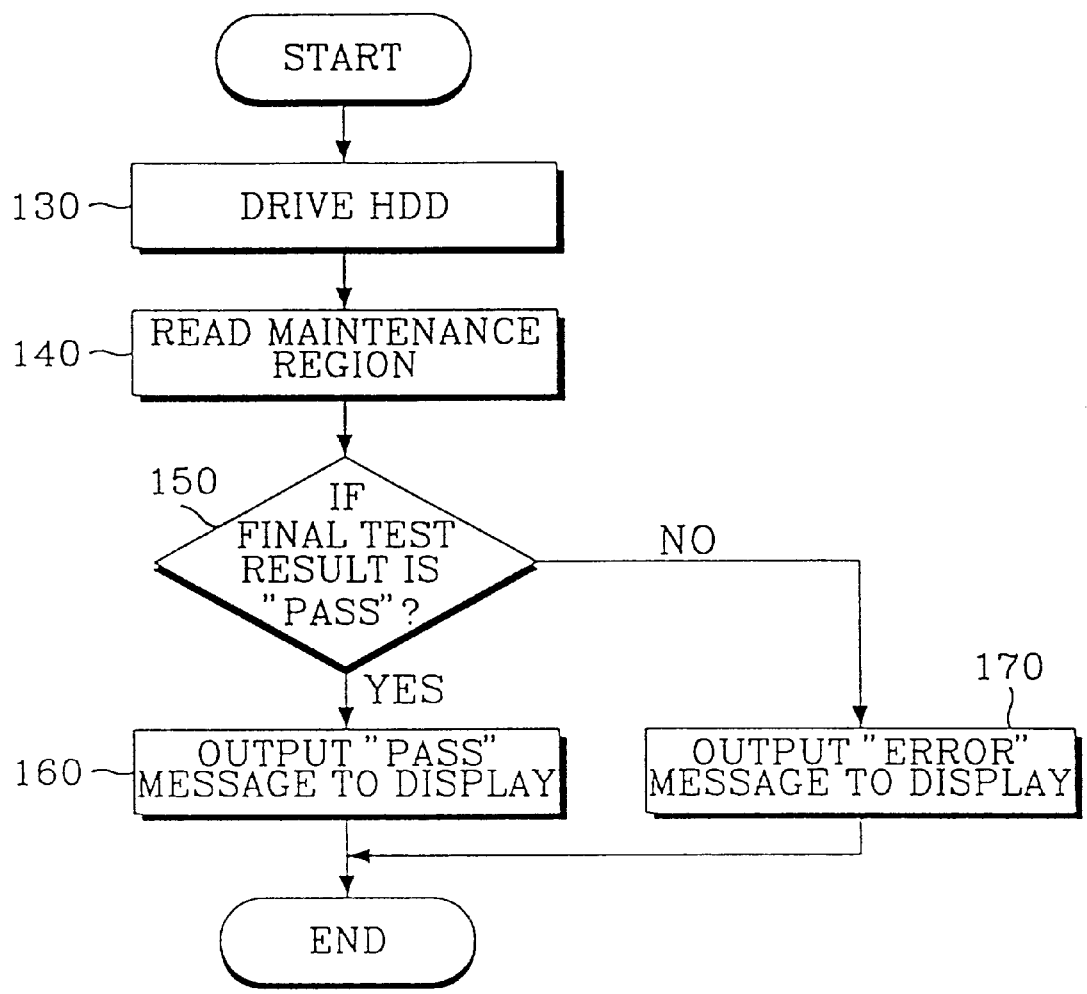
FIG. 9 is a flow chart showing the control process of a controller for judging the acceptance according to the embodiment of the present invention.

FIG. 8 is a block diagram of the acceptance tester according to the embodiment of the present invention, and FIG. 9 is a flow chart showing the control process of a controller for judging acceptance according to the embodiment of the present invention. Referring to FIG. 8, hard disk drives HDD1, HDD2 and HDD3 designate the hard disk drive set 50 which is mounted on mount 70. Signal port 80 and power port 90 of hard disk drive set 50 (FIG. 5) are connected to controller 110 on the motherboard through connectors 80a and 90a (FIG. 7). Controller 110 includes a memory having a control program for fabrication process acceptance testing. Controller 110 outputs pass/fail information of hard disk drive set 50 according to the control program, and at the same time, transmits the information to host computer 10 (FIG. 3) through a LAN module 120 (FIG. 8). By doing so, hard disk drive set 50—which passed a series of fabrication processes—is easily controlled.

Figure 6:
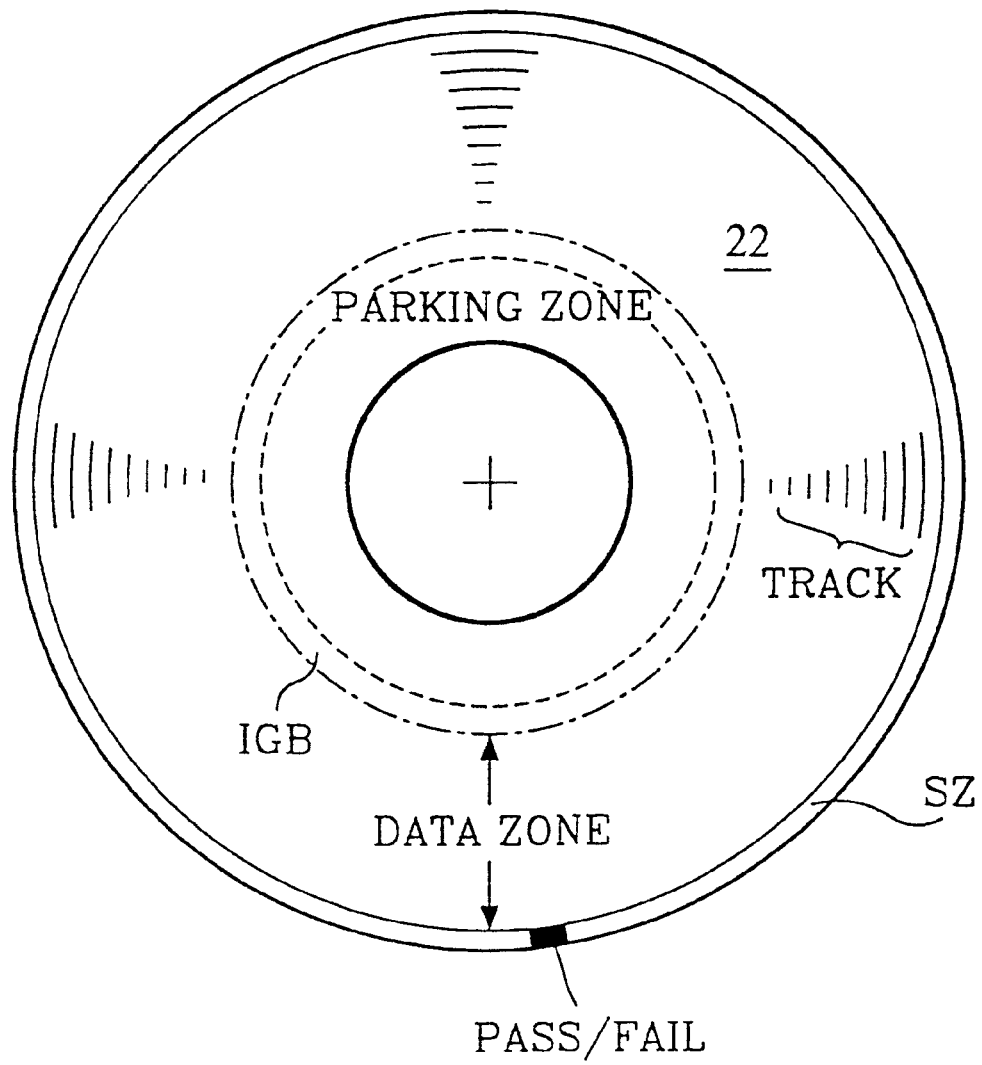
FIG. 6 shows a hard disk for recording of pass/fail information on a system zone of the disk during a final test process according to the embodiment of the present invention.

The control operation of controller 110 will be explained below. Referring to FIG. 9, at stage 130, controller 110 drives hard disk drive set 50 mounted on mount 70. At stage 140, controller 110 moves the head of the hard disk drive set 50 to the maintenance region, and then reads pass/fail information for fabrication process acceptance testing of hard disk drive set 50. The pass/fail information is the information recorded in the maintenance region of the hard disk 22 during the final test process (V), as shown in FIG. 6. Thereafter, at stage 150, controller 110 tests whether the final test result is "pass". If the final test result is "pass", controller 110 outputs a "pass" message to display 100 at stage 160. On the other hand, if the final test result is not "pass", controller 110 outputs an "error" message to display 100 at stage 170, and then completes the control operation according to the embodiment of the present invention.

By doing so, the operator placed on the line can confirm the fabrication process state of each hard disk drive set 50 through display 100 included in acceptance tester 60. Furthermore, the information showing the fabrication process state of the hard disk drive set 50 is transmitted to the host computer 10 through LAN 120, to be thereby used as control data of the hard disk drive set 50.

As described above, the present invention adds the acceptance test process to the conventional fabrication process of the hard disk drive, to thereby perfectly prevent a defective hard disk drive from being produced.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of testing a hard disk drive which includes a hard disk, the method comprising the steps of:
   (a) providing the hard disk with a predetermined storage region;
   (b) performing various preliminary testing steps, including a final test process, on the hard disk drive;
   (c) obtaining a test result from the final test process;
   (d) recording the test result on the predetermined storage region of the hard disk; and
   (e) reading the recorded test result from the predetermined storage region of the hard disk so as to determine whether or not the hard disk drive is accepted.

2. The method as claimed in claim 1, wherein step the predetermined storage region comprises a maintenance region of the hard disk.

3. The method as claimed in claim 1, further comprising step (f) of performing a product test process, and wherein step (e) is performed between the final test process and the product test process of step (f).

4. The method as claimed in claim 1, wherein said various preliminary testing steps include the step of setting up the hard disk drive.

5. The method as claimed in claim 1, wherein said various preliminary testing steps include the step of recording a servo record pattern for servo-controlling an actuator on the hard disk drive.

6. The method as claimed in claim 1, wherein said various preliminary testing steps include the step of testing functions of the hard disk drive.

7. The method as claimed in claim 1, wherein said various preliminary testing steps include the step of burning in the hard disk drive.

8. The method as claimed in claim 1, further comprising step (f) of displaying an error message if step (e) results in a determination that the hard disk drive is not accepted and displaying a pass message if step (e) results in a determination that the hard disk drive is accepted.

9. A fabrication process acceptance tester for testing a hard disk drive, the hard disk drive having a signal port, a power port and a predetermined storage region on which pass/fail information is recorded, said tester comprising:
   connector means for connecting said tester to said signal port and to said power port of the hard disk drive;
   controller means connected to said connector means for controlling the hard disk drive through said connector means and for reading the pass/fail information from the predetermined storage region of the hard disk drive;
   display means connected to said controller means for displaying the pass/fail information; and
   transmitting means connected to said controller means for transmitting the pass/fail information to a host computer.

10. The tester as claimed in claim 9, wherein said transmitting means comprises a local area network module.

11. The tester as claimed in claim 9, wherein said hard disk drive includes a hard disk, and said predetermined storage region is located on said hard disk, said pass/fail information being recorded on and read from said predetermined storage region of said hard disk.

12. The tester as claimed in claim 11, wherein said predetermined storage region comprises a maintenance region of the hard disk.

13. A fabrication process acceptance tester for testing a hard disk drive, the hard disk drive including a signal port, a power port and a hard disk having a predetermined storage region on which pass/fail information is recorded, said tester comprising:
   connector means for connecting said tester to said signal port and to said power port of the hard disk drive;
   controller means connected to said connector means for controlling the hard disk drive through said connector means; and
   display means connected to said controller means for displaying the pass/fail information;
   wherein said controller means includes means for accessing said predetermined storage region of the hard disk to read the pass/fail information.

14. The tester as claimed in claim 13, further comprising transmitting means connected to said controller means for transmitting the pass/fail information to a host computer.

15. The tester as claimed in claim 14, wherein said transmitting means comprises a local area network module.

16. The tester as claimed in claim 13, wherein said controller means includes means for determining whether the pass/fail information indicates acceptance or non-acceptance of said hard disk drive.

17. The tester as claimed in claim 16, wherein said display means displays a pass message if the pass/fail information indicates acceptance of said hard disk drive.

18. The tester of claim 16, wherein said display means display an error message if the pass/fail information indicates non-acceptance of said hard disk drive.

19. The tester as claimed in claim 13, wherein said predetermined storage region comprises a maintenance region of the hard disk.

* * * * *